(12) United States Patent
Fenton et al.

(10) Patent No.: US 6,309,543 B1
(45) Date of Patent: Oct. 30, 2001

(54) DIALYZER COUPLING DEVICE

(75) Inventors: Thomas L. Fenton, St. Louis Park; Scott D. Wolbers, Eden Prairie; Wayne G. Carlson, St. Paul; Shawn P. Grady, Albertville, all of MN (US)

(73) Assignee: Minntech Corporation, Minneapolis, MN (US)

( * ) Notice: Subject to any disclaimer, the term of this patent is extended or adjusted under 35 U.S.C. 154(b) by 0 days.

(21) Appl. No.: 09/361,133

(22) Filed: Jul. 27, 1999

(51) Int. Cl.$^7$ ........................................... B01D 65/00
(52) U.S. Cl. ............... 210/232; 210/238; 210/321.72; 285/148.19; 285/148.21; 285/38
(58) Field of Search ............... 210/232, 321.72, 210/238; 285/148.18, 148.19, 148.21, 148.22, 148.23, 38; 604/905, 535, 533, 538, 534; D23/262; D24/129

(56) References Cited

U.S. PATENT DOCUMENTS

| | | | |
|---|---|---|---|
| D. 268,871 | * | 5/1983 | Benham et al. . |
| D. 314,050 | * | 1/1991 | Sone . |
| D. 339,417 | * | 9/1993 | Sampson et al. . |
| D. 375,160 | * | 10/1996 | Sampson et al. . |
| 3,876,234 | * | 4/1975 | Harms . |
| 4,266,815 | | 5/1981 | Cross . |
| 4,517,081 | | 5/1985 | Amiot et al. . |
| 4,592,749 | * | 6/1986 | Ebling et al. . |
| 4,629,455 | | 12/1986 | Kanno . |
| 4,639,019 | | 1/1987 | Mittleman . |
| 4,676,580 | | 6/1987 | Nordgren et al. . |
| 4,824,145 | * | 4/1989 | Carlsson . |
| 4,991,629 | | 2/1991 | Ernesto et al. . |
| 5,052,725 | | 10/1991 | Meyer et al. . |
| 5,181,750 | * | 1/1993 | Reum . |
| 5,263,945 | | 11/1993 | Byrnes et al. . |
| 5,312,377 | * | 5/1994 | Dalton . |
| 5,586,977 | * | 12/1996 | Dorsey, III . |
| 5,611,576 | | 3/1997 | Guala . |
| 5,788,215 | | 8/1998 | Ryan . |
| 5,947,954 | * | 9/1999 | Bonaldo . |

OTHER PUBLICATIONS

Stedman's Medical Dictionary, 26th Edition, Oct. 1995, pp. 998 and 1748.*

Renal Systems; Maximum Flexibility in an Integrated System; Renatron II Dialyzer Reprocessing System; Pamphlet; 1996.

* cited by examiner

Primary Examiner—John Kim
Assistant Examiner—David Sorkin
(74) Attorney, Agent, or Firm—Nixon & Vanderhye PC

(57) ABSTRACT

A coupling device that reduces the risk of cross-contamination of dialyzers during reprocessing by providing a reusable, easily disinfected connector for coupling a dialyzer to, e.g., the blood line of a dialyzer reprocessing system. The coupling device is in the form of a one-piece adapter for being screwed to the luer connector of a dialyzer and then axially attached to a blood line of a dialyzer reprocessing device via a quick connect/disconnect coupling. The adapter is reusable and easily disinfected by soaking it in liquid disinfectant.

15 Claims, 3 Drawing Sheets

DIALYZER COUPLING DEVICE

BACKGROUND OF THE INVENTION

1. Field of the Invention

The present invention relates to a coupling assembly and, more particularly, to a coupling device for interconnecting a dialyzer reprocessing system to a dialyzer blood port.

2. Description of the Related Art

There is significant concern about possible cross-contamination of dialyzers that are being reprocessed if the blood port connector on the reprocessing machine is not adequately disinfected between uses. Many conventional dialyzer reprocessing systems use a luer/tubing connector to connect the blood line thereof to the dialyzer blood port. This connector is generally not removed from the reprocessor tubing and, therefore, disinfection is typically limited to wiping the connector with disinfectant. In addition, the tubing must be twisted in order to thread the connector onto the luer connection of the dialyzer blood port.

Some reprocessing systems provide a quick connect/disconnect coupling on the blood line thereof. Conventional quick connect/disconnect couplings are adapted to interconnect tube segments and thus use conventional tubing connectors. See in that regard, U.S. Pat. No. 5,052,725, the disclosure of which is incorporated herein by this reference. Therefore, a conventional quick disconnect can only be used to interconnect a quick connect/disconnect equipped reprocessor to the luer fitting on the dialyzer if additional tubing is used to connect the quick disconnect to a luer/tubing connector that is in turn connected to the luer connector of the dialyzer. This additional tubing means that there are additional parts that must be disinfected and the tubing must still be twisted to thread the luer connector onto the dialyzer port. In addition, the cost of multiple sets of the removable portion, i.e. the tubing with connectors on both ends, makes disinfecting by removal and soaking impractical. Therefore, providing a quick disconnect coupling on the blood line does not solve the problem of improving disinfection and simplifying attachment to the luer connector of the dialyzer.

SUMMARY OF THE INVENTION

It is an object of the present invention to provide a coupling device that reduces the risk of cross-contamination of dialyzers during reprocessing by providing a reusable, easily disinfected connector for coupling a dialyzer to, e.g., the blood line of a dialyzer reprocessing system.

It is a further object of the present invention to provide a coupling device that allows a dialyzer to be coupled to a dialyzer reprocessing system without rotating or twisting associated tubing.

The foregoing objects are realized in accordance with the invention by providing a coupling device that is a simple, one-piece adapter for being screwed to the luer connector of the dialyzer at a luer connector end thereof and then axially attached to a blood line of a dialyzer reprocessing device via a quick connect/disconnect coupling end thereof. The adapter is reusable and easily disinfected by simply soaking it in liquid disinfectant. Since there is no tubing incorporated in the adapter, costs are minimized and handling is facilitated. Moreover, the thicker side wall realized by the elimination of a tubing nipple extends the connector life and makes it more reliable. In accordance with a presently preferred embodiment, the adapter also includes grip wings or a grippable outer surface to facilitate threading of the luer connector end thereof to the dialyzer blood port.

BRIEF DESCRIPTION OF THE DRAWINGS

These, as well as other objects and advantages of this invention, will be more completely understood and appreciated by careful study of the following more detailed description of presently preferred exemplary embodiments of the invention taken in conjunction with the accompanying drawings, in which.

DETAILED DESCRIPTION OF THE INVENTION

Figure 1:
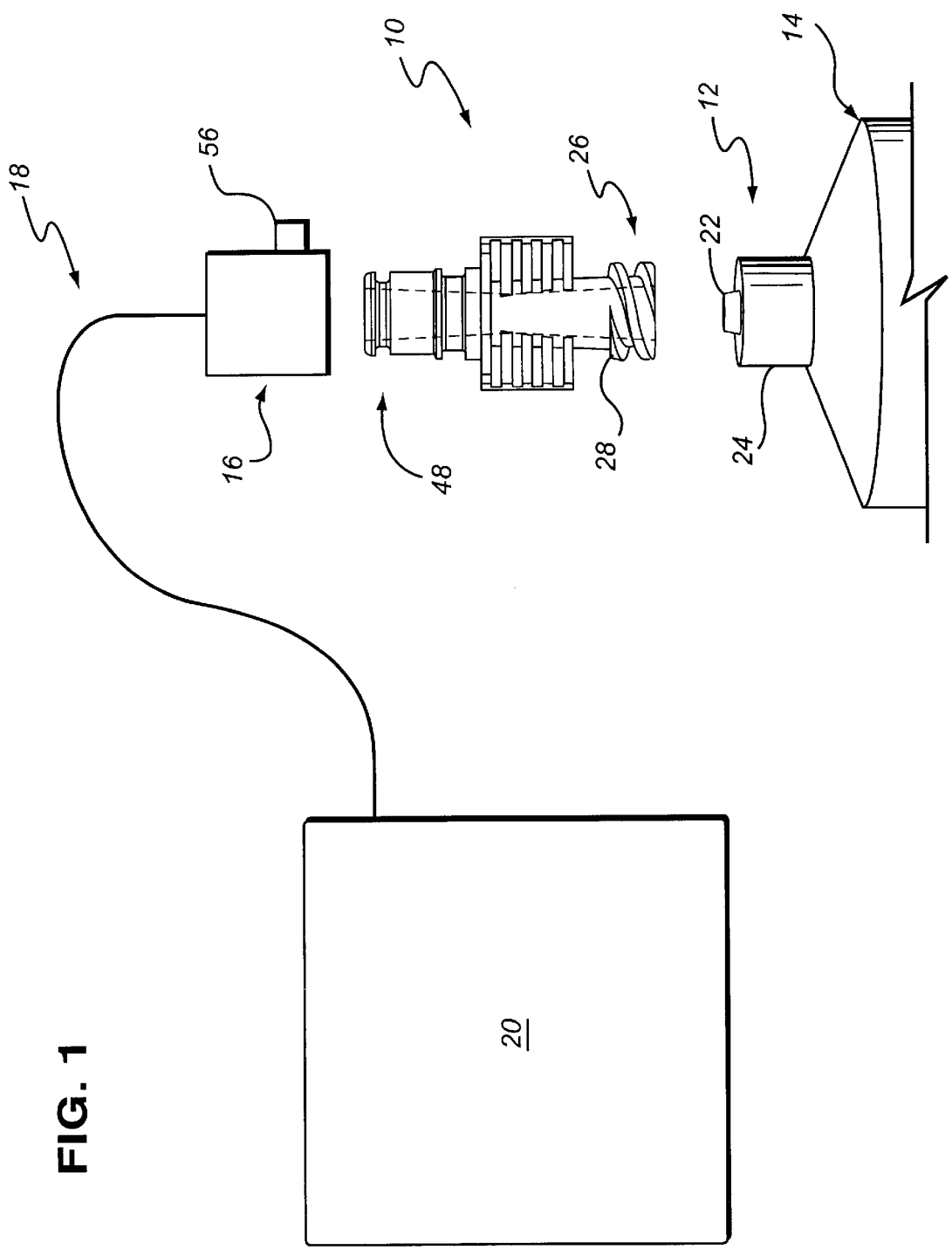
FIG. 1 is a schematic illustration of a coupling device provided in accordance with the invention disposed for connecting a dialyzer reprocessing system and a dialyzer.

The coupling device 10 provided in accordance with the present invention is formed as a single, molded piece, that is constructed and arranged to act as an adapter between the coupling 12 provided at a blood port of a dialyzer 14 and a coupling structure 16 provided on a blood line 18 of a dialyzer reprocessing system 20.

The dialyzer 14 with which the coupling device 10 of the invention is adapted to be used has blood ports (only one of which is schematically shown in FIG. 1) with luer-type connectors 12, for example, a luer tip 22 surrounded by a shroud 24 having internal threads. To securely engage the luer connector of the dialyser blood port, one end of the adapter 10 is formed as an externally threaded luer-type connector structure 26 so that the connector can be screwed to the dialyzer blood port connector 12. The luer connector structure 26 may be a luer-type thread 28 that extends part circumferentially, in a spiral of about 180° in the illustrated embodiment, or may be more truncated luer tabs or ears.

Figure 7:
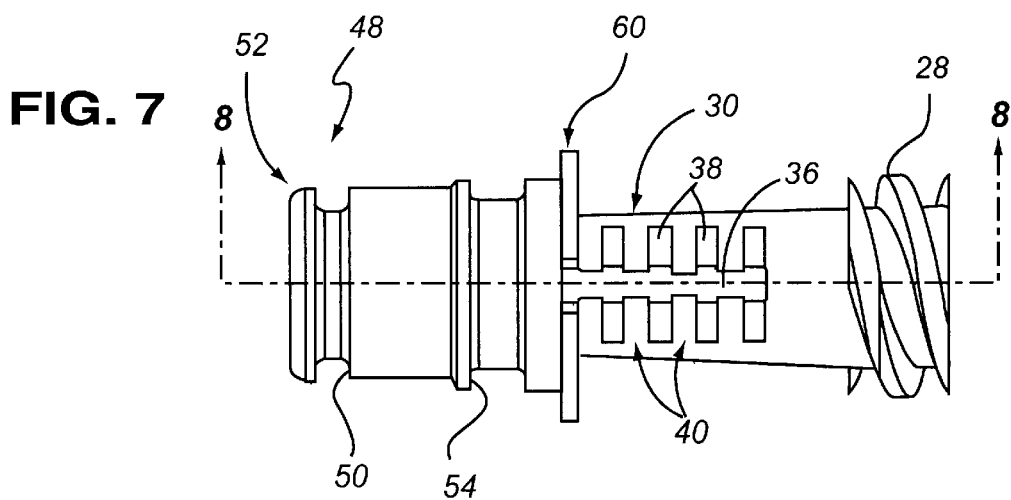
FIG. 7 is a view taken from above in FIG. 6.
Figure 8:
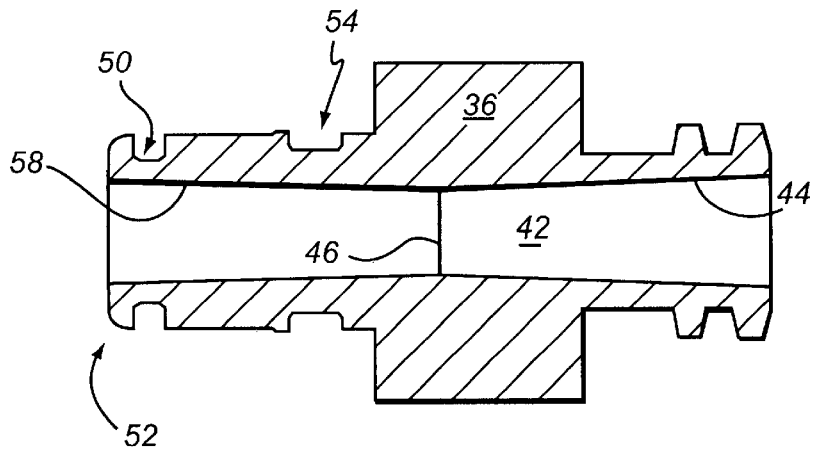
FIG. 8 is a view taken along lines 8—8 of FIG. 7.

To facilitate gripping and rotating of the adapter during connection to the dialyzer blood port, the main body 30 of the coupling device preferably has a friction enhanced, grippable surface defined thereon. While the grippable surface may be a knurled surface or a surface having a series of, for example, longitudinally extending ribs, in accordance with the present preferred embodiment, at least two grip wings 32 are formed to extend from diametrically opposite sides of the adapter main body 30. In the illustrated embodiment, the grip wings each extend radially outwardly from and along a portion of the length (longitudinally) of the main body to define digit engaging surfaces 34 which facilitate gripping and rotation of the adapter, particularly during the luer attachment process. More specifically, each of the grip wings 32 is defined by a longitudinally extending and radially projecting spine 36 and a plurality of radial and part circumferential flanges or ribs 38. The part circumferential ribs have gaps 40 therebetween so as to define discontinuous digit engaging surfaces 34 which facilitate gripping and are advantageous in the molding process. In the illustrated embodiment, furthermore, the ribs 38 define finger engaging surfaces 34 that are inclined to the plane of the grip wing spine 36. It is to be understood that as an alternative to the grip wing structure shown, generally planar grip tabs may be provided and thus the illustrated embodiment is merely exemplary of a grip wing configuration that may be provided, showing the presently preferred embodiment of the invention in this regard. As shown for example in FIG. 7, the interior bore 42 of the adapter is tapered as at 44 from a maximum internal diameter adjacent the inlet to the screw threaded, luer end 26 and tapers to a minimum dimension at substantially a midpoint 46 of the adapter structure.

Figure 3:
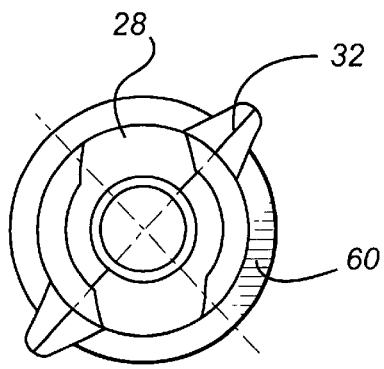
FIG. 3 is an end view of the coupling device, taken from the luer connector end thereof.
Figure 5:
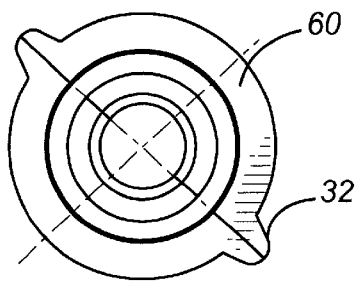
FIG. 5 is an end view of the coupling device, taken from the quick disconnect end thereof.
Figure 2:
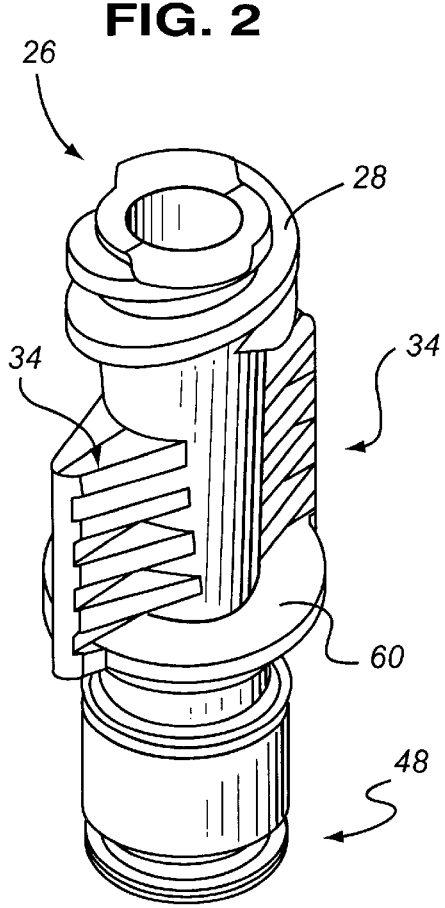
FIG. 2 is a perspective view of a coupling device provided in accordance with a preferred embodiment of the invention, taken from the luer connector end thereof.
Figure 4:
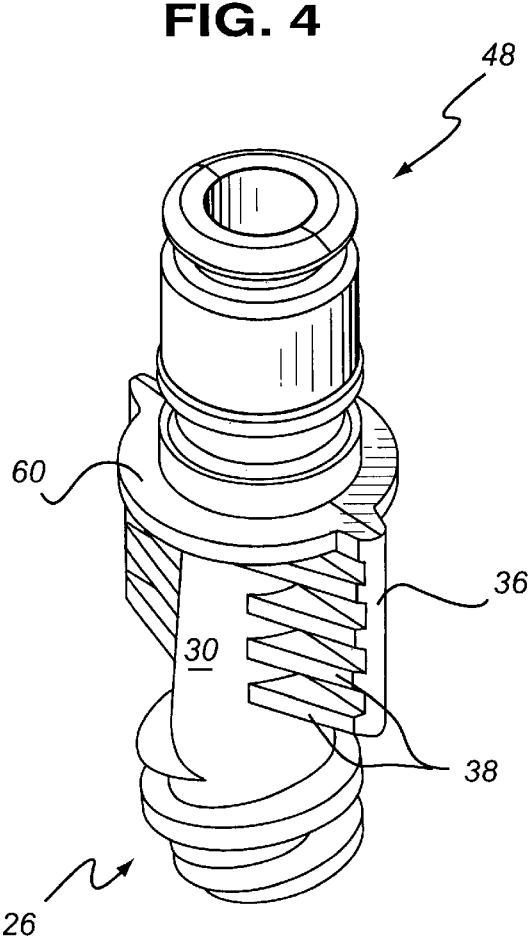
FIG. 4 is a perspective view of a coupling device provided in accordance with a preferred embodiment of the invention, taken from the quick disconnect end thereof.
Figure 6:
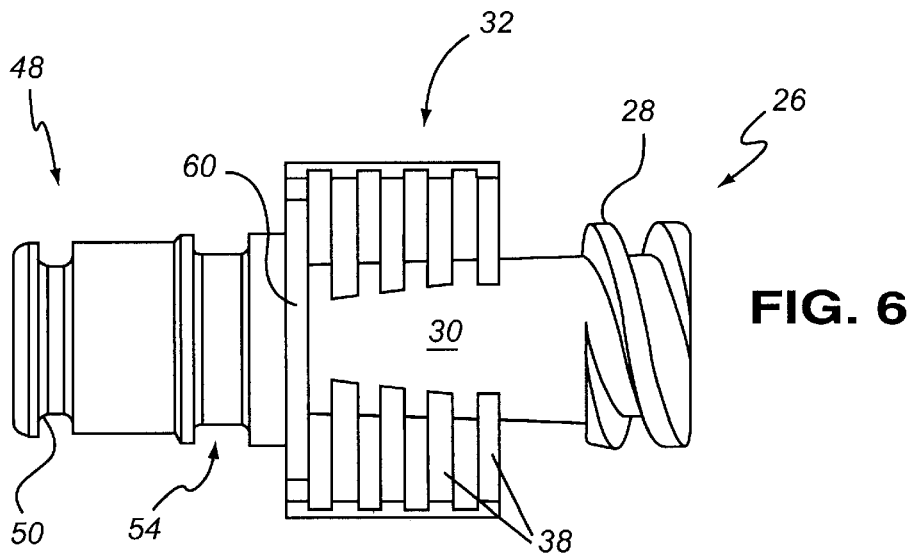
FIG. 6 is an elevational view of the coupling device provided in accordance with the invention.

The second end of the adapter provided in accordance with the present invention is defined as a quick disconnect coupling structure 48 so that the adapter, once threaded to the dialyzer blood port, may be connected to a complimentary female quick disconnect coupling 16 provided at a free end of the blood line 18 extending from the dialyzer reprocessing system 20. The configuration of the quick connect/disconnect end 48 generally corresponds to conventional quick connect couplings of the type shown in U.S. Pat. No. 5,052,725. Thus, the quick connect/disconnect end is adapted to be coupled to a female connector of the type illustrated in the 725 patent provided at the free end of the reprocessing tubing. More specifically, the quick connect/disconnect male coupling defines a first sealing recess 50 adjacent the free end 52 thereof for receiving an O-ring (not shown) about the exterior surface thereof, thereby to provide a fluid tight seal between the exterior surface of the male coupling member 48 and the interior surface of the conventional female quick disconnect coupling member 16 when in the connected state. The quick disconnect connector end includes a further, locking recess 54 for receiving a conventional component, such as a spring urged clip member 56, mounted to the female coupling 16 so that when the male coupling is inserted into the female coupling, the clip is initially engaged by and displaced by the rounded tip 52 of the male connector and then upon alignment with the second groove or locking recess 54, the clip 56 is resiliently displaced into the groove to lock the male connector within the female connector, in a conventional manner. As shown, for example, in FIG. 7, the bore in the quick connect coupling end of the adapter provided in accordance with the invention is tapered as at 58. The bore is tapered from a maximum diameter adjacent the free end 52 of the quick connect coupling 48 end to a minimum diameter substantially at the mid point 46 of the adapter. As can be seen, for example, in FIGS. 2 and 3, in particular, a stop flange 60 is also defined peripherally of the adapter to limit insertion of the quick connect coupling structure 48 into the female coupling 16, to ensure proper registry of the clip 56 of the female coupling 16 with the locking groove of the quick connector 48.

In an exemplary embodiment, the adapter provided in accordance with the invention is molded from a semi-rigid PVC material.

As described above, the coupling device 10 of the invention is adapted to couple a dialyzer 14 having a blood port that comprises a luer type coupling, shown generally at 12, to a dialyzer reprocessor 20 having a blood line tube 18 terminating at its free end in a female quick connect/disconnect coupling structure 16 of the type disclosed, for example, in U.S. Pat. No. 5,052,725. An exemplary dialyzer reprocessor is the Renatron®, which is an embodiment of the reprocessor disclosed in U.S. Pat. No. 4,517,081, the disclosure of which is incorporated herein by this reference. To couple the dialyzer 14 to the dialyzer reprocessor 20, the coupling device 10 is first coupled to the dialyzer 14 by rotating the coupling device 10 to engage the luer type connector 26 provided on the coupling device/adapter 10 to the luer type connector structure 12 provided on the dialyzer 14. In the disclosed embodiment, the luer type connector provided on the adapter defines a tapered interior bore 44 for receiving the tapered luer tip 22 of the luer connector 12 on the dialyzer and a screw thread 28, or luer tabs or ears, defined on the exterior surface of adapter 10 for engaging screw threads (not shown) defined on the interior of the shroud 24 encircling the luer tip 22 of the blood port connector 12. Once the coupling device 10 has been coupled to the dialyzer 14, the male quick connect coupling end 48 of the adapter 10 can be axially inserted into the complimentary female quick connect/disconnect connector 16 provided on the free end of the blood line tube 18. In a known manner, a radial locking structure, such as a spring biased clip 56, engages the locking groove 54 of the adapter 10 to axially lock the adapter relative to the blood line tube.

As is apparent from the foregoing, the adapter provided in accordance with the invention simplifies the connection process and allows the operator to perform a more significant disinfection process, e.g., by soaking the coupling device. Indeed, the connector provided in accordance with the invention allows the user to remove it after each use and soak it in a disinfecting agent while using another already disinfected connector for the next cycle. A better, easier disinfectant capability is thus provided in accordance with the invention that provides for a longer dwell time in the disinfecting agent. In addition, the one piece molded connector provided in accordance with the invention defines a thicker side wall which will extend the connector life and make it more reliable. Moreover, because the adapter has no tubing associated with it and can be first threaded to the dialyzer, tube twisting is eliminated, thus simplifying the connection process and minimizing the risk of damage to or disconnection of the reprocessor blood line during the dialyzer connection process. It is therefore anticipated that the adapter of the invention will have a long life, be more reliable, and be universally easier to connect than conventional connectors, in particular for dialyzer reprocessing.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. Thus, while the invention has been described with reference in particular to dialyzer reprocessing, it is to be understood that the coupling of the invention is not to be limited to that implementation except as so specified in the claims presented hereinbelow.

What is claimed is:

1. A one piece coupling device comprising:
    a main body, a bore for fluid flow being defined through said main body;
    a first connector structure defined at a first end of said main body, said first connector structure comprising a luer taper connector structure; and
    a second connector structure defined at a second end of said main body, said second connector structure comprising a male coupling structure for axial, quick connect with a complimentary female connector structure, said male coupling structure including a locking groove axially offset from a free end thereof for selectively receiving a radial locking component of the complimentary female connector structure so as to axially lock said male coupling structure in the complimentary female connector structure, first and second grip wings extending radially outwardly from said main body each said grip wing being defined generally in a respective plane disposed at an angle of about 90° with respect to a plane perpendicular to a longitudinal axis of said bore, each said grip wing extending along at least a portion of a length of said main body so as to define engagement surfaces for manually gripping and rotating said main body, wherein said grip wings each comprise a radially and longitudinally extending spine portion and a plurality of radial and part circumferential rib portions disposed generally transverse to said spine portion on first and second sides of said spine portion, said rib portions together defining first and second engagement surfaces, respectively, on said first and second sides of said spine portion.

2. A one piece coupling device as in claim 1, wherein said male coupling structure further comprises a sealing groove for receiving a sealing ring structure for providing a fluid tight seal with the complementary female connector structure.

3. A one piece coupling device as in claim 1, wherein said main body has a longitudinal axis, said bore being defined along said longitudinal axis and said first and second connector structures are respectively defined at first and second longitudinal ends of said main body.

4. A one piece coupling device as in claim 1, further comprising a stop flange extending radially outwardly from an outer circumferential surface of said main body so as to limit insertion of said male quick connect coupling structure into the complimentary female connector structure.

5. A one piece coupling device as in claim 1, wherein a plane of each said engagement surface is inclined to a plane of said spine portion.

6. A one piece coupling device as in claim 1, wherein said luer taper connector structure of the first connector structure includes a thread structure disposed on an exterior surface of said main body and extending at least part circumferentially of said main body for engagement with a complimentary connector structure.

7. A one piece coupling device as in claim 6, wherein said luer thread extends at least about 180° in a spiral about said first end.

8. A one piece coupling device as in claim 1, wherein said bore tapers from a maximum diameter adjacent said first and second ends of said main body to a minimum diameter substantially at a midpoint along a length of said main body.

9. A dialyzer reprocessing assembly comprising:
a dialyzer reprocessor including a blood line tube for being coupled to a dialyzer to be reprocessed, a free end of said blood line tube having a female quick connect/disconnect coupling structure mounted thereto;
a dialyzer having a blood port comprising a luer taper connector structure; and
a one piece coupling device interconnecting said blood line tube to said blood port, said coupling device including:
a main body having a longitudinal axis,
a bore for fluid flow defined through said main body, along said longitudinal axis;
a first connector structure defined at a first longitudinal end of said main body, said first connector structure comprising a luer taper connector structure engaging said luer taper connector of said blood port;
a second connector structure defined at a second longitudinal end of said main body, said second connector structure comprising a male coupling structure that is axial, quick connected with said female coupling structure, said male coupling including a locking groove axially offset from a free end thereof for selectively receiving a radial locking component of the female coupling structure so as to axially lock said male coupling in the complimentary female coupling structure, and
first and second grip wings extending radially outwardly from said main body each said grip wing being defined generally in a respective plane disposed at an angle of about 90° with respect to a plane perpendicular to a longitudinal axis of said bore, each said grip wing extending along at least a portion of a length of said main body so as to define engagement surfaces for manually gripping and rotating said main body,
wherein said grip wings each comprise a radially and longitudinally extending spine portion and a plurality of radial and part circumferential rib portions disposed generally transverse to said spine portion on first and second sides of said spine portion, said rib portions together defining first and second engagement surfaces, respectively, on said first and second sides of said spine portion for manually gripping and rotating said main body.

10. A dialyzer reprocessing assembly as in claim 9, further comprising a stop flange extending radially outwardly from an outer circumferential surface of said main body so as to limit insertion of said male quick connect coupling structure into the complimentary female coupling structure.

11. A dialyzer reprocessing assembly as in claim 9, wherein a plane of each said engagement surface is inclined to a plane of said spine portion.

12. A dialyzer reprocessing assembly as in claim 9, wherein said luer taper connector structure at said first longitudinal end includes a thread structure defined on an exterior surface of said main body and extending at least part circumferentially of said main body for engagement with a complimentary luer thread of said blood port connector structure.

13. A dialyzer reprocessing assembly as in claim 9, wherein said bore of said one piece coupling device tapers from a maximum diameter adjacent said first end of said main body to a minimum diameter substantially at a midpoint along a length of said main body.

14. A method of coupling a dialyzer having a blood port comprising a luer taper connector to a dialyzer reprocessor having a blood line tube terminating at a female connector comprising: providing a one-piece coupling device having:
a main body,
a bore for fluid flow being defined through said main body;
a first connector structure defined at a first end of said main body, said first connector structure comprising a luer taper connector structure complementary to said luer taper connector of said dialyzer,
a second connector structure defined at a second end of said main body, said second connector structure comprising a male connector structure for axial, quick connect to said female connector, said male connector structure including a locking groove axially offset from a free end thereof for selectively receiving a radial locking component of the female connector so as to axially lock said male coupling structure in the female connector, and first and second grip wings extending radially outwardly from said main body each said grip wing being defined generally in a respective plane disposed at an angle of about 90° with respect to a plane perpendicular to a longitudinal axis of said bore, each said grip wing extending along at least a portion of a length of said main body so as to define engagement surfaces for manually gripping and rotating said main body, wherein said grip wings each comprise a radially and longitudinally extending spine portion and a plurality of radial and part circumferential rib portions disposed generally transverse to said spine portion on first and second sides of said spine portion, said rib portions together defining first and second engagement surfaces, respectively, on said first and second sides of said spine portion;

coupling said first connector structure to said luer taper connector of said dialyzer by rotating the coupling device relative to said dialyzer; and coupling said second connector structure to said blood line tube of said reprocessor by axially inserting said male connector structure into said female connector of said reprocessor.

15. A method as in claim 14, wherein said step of coupling said first connector structure comprises manually grasping said grip wings and rotating said main body.

* * * * *

UNITED STATES PATENT AND TRADEMARK OFFICE
CERTIFICATE OF CORRECTION

PATENT NO. : 6,309,543 B1
DATED : October 30, 2001
INVENTOR(S) : Fenton et al.

Page 1 of 1

It is certified that error appears in the above-identified patent and that said Letters Patent is hereby corrected as shown below:

<u>Title page,</u>
Item [75], Inventors: "Thomas L. Fenton, St. Louis Park; Scott D. Wolbers, Eden Prairie; Wayne G. Carlson, St. Paul; Shawn P. Grady, Albertville, all of MN (US)"

should be

-- [75] Inventor: Thomas L. Fenton, St. Louis Park, MN (US) --

Signed and Sealed this

Fifth Day of November, 2002

Attest:

Attesting Officer

JAMES E. ROGAN
*Director of the United States Patent and Trademark Office*